(12) United States Patent
Mallof (10) Patent No.: US 6,305,169 B1
(45) Date of Patent: Oct. 23, 2001

(54) MOTOR ASSISTED TURBOCHARGER

(76) Inventor: Ralph P. Mallof, 4527 Park Monaco, Calabasas, CA (US) 31302

(*) Notice: Subject to any disclaimer, the term of this patent is extended or adjusted under 35 U.S.C. 154(b) by 0 days.

(21) Appl. No.: 09/655,696

(22) Filed: Sep. 6, 2000

Related U.S. Application Data (63) Continuation of application No. 09/255,423, filed on Feb. 22, 1999.

(51) Int. Cl.[7] ..................................................... F02B 33/44
(52) U.S. Cl. ................................................................ 60/608
(58) Field of Search ..................................................... 60/608

(56) References Cited

U.S. PATENT DOCUMENTS 5,771,695 * 6/1998 Halimi ................................. 60/608

FOREIGN PATENT DOCUMENTS 0 304 384 * 2/1989 (EP).
2 381 208 * 9/1978 (FR).

* cited by examiner

*Primary Examiner*—Noah P. Kamen (57) ABSTRACT

A motor assisted turbocharger comprised of a compressor rotor and a motor drive on separate aligned bearing axes, and a torque transmitting slip coupling therebetween devoid of mechanical interengagement and driving the compressor on demand, and an engine exhaust driven turbine rotor coupled to the compressor rotor with an averrunning clutch which separates the compressor mass from the turbine mass for maximized acceleration of the compressor rotor and turbine rotor by disengagemnt of the turbine rotor from the compressor rotor, and with an inertia responsive mechanism to engage and disengage said torque transmitting slip coupling.

43 Claims, 6 Drawing Sheets

MOTOR ASSISTED TURBOCHARGER

This is a Continuation of application Ser. No. 09/255,423 filed Feb. 22, 1999.

BACKGROUND

This invention relates to improved operation of turbochargers as applied to internal combustion engines and the like. The general concept of turbo-charging is to employ the residual energy in engine exhaust to increase induction air pressure before final compression in the engine. It is internal combustion engines with which this invention is particularly concerned, of any combustion cycle, and preferably those state of the art engines into which fuel is fed according to regulatory environmental factors to which said engines are subjected; all of which includes the type of fuel, the mode of feeding said fuel, the angular velocity and torque change or constants, and the various temperature conditions, all as circumstances require. And in view of efficiency and environmental regulatory requirements, it is a general object of this invention to provide substantially instantaneous increases in induction air pressures into the engine according to variations in performance demand. To this end, the compressor rotor of the turbo-charger can be accelerated independently of the turbine rotor thereof, whereby the mass inertia of the turbine rotor does not retard acceleration of the compressor rotor.

Internal combustion engines are characterized by two basic requirements, controlled fuel feed, and the proper induction of air to establish a correct air-fuel ratio required for efficient combustion. These two basic requirements are interrelated and are subject to electronic computer control. State of the art electronics provides instantaneous operational calculations to which the engine must respond in order to achieve efficient operation with any internal combustion engine having multi-port, throttle-body or direct injection irrespective of fuel type. However, despite the instantaneous demand for increased combustion air due to sudden changes in load and torque demand, there is an inherent "turbo-lag" involved in the acceleration of state of the art turbochargers. In the internal combustion engine, carburetor fuel feed has been greatly replaced by electronically controlled fuel injection, the amount of fuel injected being determined by the time during which the injector remains in the "ON" position, calculated by an electronic computer geared to various parameters including; absolute pressure in the inlet manifold, Air flow rate, RPM, engine load, crankshaft position related to T.D.C., engine coolant temperature, engine inlet air temperature, exhaust oxygen content, and torque demand. Also, internal combustion engines are often supercharged with induction air and subject to wide ranges of operational requirements under varying conditions. And, heretofore the prevailing deficiency has been "turbo-lag" in the induction air pressure supplied, this time-lag resulting in deficient engine operation. It is therefore an object of this invention to provide a method and apparatus by which adequate combustion air is substantially instantaneously supplied to the induction manifold of an internal combustion engine.

The method and apparatus herein disclosed gives increased power and makes the engine more flexible and more responsive, for any given engine RPM and/or torque requirement. Cold starting becomes improved allowing immediate augmentation of engine compression heated air flow, and all adjustments become automatic. It moreover simplifies the fuel control process which enhances compliance with exhaust emission regulations, being a rational method and/or system which allows the engine to be fed adequate induction air as necessary together with adequate fuel for proper and efficient operation under all conditions of use.

State of the art turbochargers employ a "unitized" principle of construction, wherein the compressor rotor and turbine rotor are integrally coupled by a common shaft. Therefore, the mass of each is combined with the other so as to affect common acceleration and deceleration. It is the acceleration of the compressor rotor with which this invention is particularly concerned, because the turbine rotor is inherently coupled to respond to exhaust gas energy discharged from the engine combustion chambers. Furthermore, said exhaust gases are not increased (or decreased) in pressure and/or velocity until after a change in induction pressure and combustion temperature occurs. Accordingly, there is a measurable time period before an exhaust pressure change reaches the turbine rotor, and only then does the turbine rotor respond to gradually increase its momentum, while the engine waits for the required induction pressure increase to be reached. The result is "turbo-lag" during which the engine is starved of adequate induction air for proper acceleration.

The state of the art provides auxiliary prime movers for supplementing the turbine drive in order to accelerate the mass of the combined rotor components. However, there are at least two problems here. 1) The mass of the two rotors is approximately twice that of either, and rapid acceleration of the compressor rotor is essential in order to enhance air induction. Heretofore, the torque required of the auxiliary prime mover has been twice that which would be required to accelerate the compressor rotor alone, and therefore it is an object of the invention to disengage the compressor rotor from the turbine rotor and thereby maximize acceleration of the former independently of the latter. In practice, this separation occurs during the initial phase of acceleration, as will be apparent from the following: 2) The auxiliary prime mover is preferably an electric motor having high initial torque and acceleration. However, state of the art electric motors have RPM limitations which are exceeded by the ultimate RPM attained by state of the art turbochargers here under consideration, and therefore it is an object of this invention to isolate the RPM restricted electric motor drive from the ultimately higher RPM drive of the turbine rotor and compressor rotor when driven thereby. This arrangement thereby provides a substantially instantaneous supply of adequate induction air pressure to be followed by a "take-over" effect as and when the turbine rotor drive exceeds the "limit RPM" range of the motor drive.

From the foregoing it will be observed that there is a primary objective to protect the auxiliary electric motor drive from exceeding its structurally limited RPM which is lesser than turbocharger RPM. Heretofore, "single direction bearings" have been employed in the art in order to couple the prime mover auxiliary to the unitized compressor rotor and turbine rotors. It is therefore an object of this invention to provide a coupling means that transmits torque applied by said auxiliary electric motor drive to the compressor rotor. In practice, this is achieved by utilizing a hysteresis or eddy-current coupling that transmits torque to the compressor rotor during an "acceleration mode", and which relinquishes its drive effect as and when the limit RPM of said motor is reached, whereupon the turbine rotor continues to accelerate the compressor rotor into a "running mode" beyond the auxiliary motor limit RPM.

It is also a primary object of this invention to separate the mass to be accelerated, and to reduce torque required of the auxiliary electric motor drive as well. To this end, the compressor rotor is disconnected from the turbine rotor during the acceleration mode, thereby permitting the compressor rotor to overrun the speed of the turbine rotor, which occurs during the acceleration mode when there is an increased induction air pressure demand. In practice, an overrunning clutch is ultilized for this function, whereby the compressor rotor mass is independently accelerated from the detached turbine rotor mass. As a result, the turbine rotor mass is free of the compressor rotor load and independently lags for its maximized acceleration comensurate with the delay in exhaust gas discharge which is reduced from the engine which is waiting for the induction air pressure increase demanded thereby. Accordingly, the compressor rotor mass is accelerated together with the auxiliary electric motor drive therefor, and the turbine rotor mass is accelerated alone by the available exhaust gases.

It is also an object of this invention to combine 1) the aforesaid object to provide a coupling means to transmit torque applied by said auxiliary electric motor drive and 2) the aforesaid object to separate the masses to be accelerated. Accordingly, the ultimate embodiment of this invention is to provide a coupling means that transmits torque to the compressor rotor by the auxiliary electric motor drive to its "limit RPM", and a coupling means for separating the mass of the turbine rotor during the acceleration mode. Accordingly, the compressor rotor is accelerated substantially instantaneously in response to induction air pressure demand in order to supply adequate combustion air for establishing a proper ratio of fuel to air mixture; all of which decreases the time interval required for effecting the process as herein disclosed.

The combination of a turbocharger with an auxiliary electric motor drive involves factors which have not been addressed in the prior art. High RPM is required of the turbine driven compressor, in a range up to 150,000 to 200,000 RPM and more, and this precludes the use of anti-friction ball, needle or roller bearings, with reliance upon sleeve type "hydrodynamic" bearings having substantial play in the form of radial clearance. However, the auxiliary electric motor drive is subject to critical concentricity and must rely upon precision ant-friction bearings such as ball bearings, which have a restrictive "limit RPM" range of 50,000 to 80,000 RPM (less RPM as size and mass increases), in order to achieve practical longevity. It is these two diverse concentricity factors that has resulted in destructive forces when applied to coupling means such as a Sprague overrunning clutch and the like, in which concentricity is critical wherein one clutch member is carried on a precision axis whereas the other clutch member is carried on a non-precision axis. Heretofore, these two diverse axes have been treated as one in fixed alignment of the turbine-compressor shaft with the auxiliary motor drive shaft. The result is destructive radial displacements to the overrunning clutch therebetween such as a Sprague or the like here under consideration. It is the radial play that produces eccentric displacement between said two axes that adversely affects mechanical couplings and clutches. Therefore, it is a primary object of this invention to eliminate the prior art incompatibility of motor and turbine bearing related functions, by separation thereof onto two distinct axes of rotation without adverse affect with respect to coupling means therebetween.

It is the aforesaid coupling means that is replaced in order to provide the aforesaid separation of axes, whereby mechanical contact between the compressor rotor and motor shaft is eliminated. In practice, an eddy-current clutch is provided for this purpose, the air gap of said clutch being non critical and such that the radial displacements experienced with hydrodynamic bearings of turbochargers are tolerated with the absence of direct mechanical engagement. Radial displacement of the hydrodynamic bearings may be as much as 0.005 to 0.008 inch; whereas the concentricity of the precision motor shaft bearings are within 0.0001 to 0.00005 inch (approximately). This is a hysteresis drive commonly referred to as an eddy-current clutch, as it is employed herein to couple the auxiliary electric drive motor to the compressor rotor or unitized compressor-turbine rotors as the case may be. Accordingly, radial play hydrodynamic sleeve bearings are made compatible with precision drive motor bearings, characterized by a distinct separation of rotation upon individual axes.

It is another object of this invention to provide a coupling means in a compressor-turbine unit for disengageably driving the aforesaid compressor rotor from the turbine rotor. In practice, an overrunning clutch is employed for this purpose, preferably a Sprague type clutch in which concentricity of its disengageable members is critical. Accordingly, the compressor-turbine unit axis is journaled on non-precision sleeve type hydrodynamic bearings having radial play, whereas the compressor rotor is journaled on precision anti-friction needle bearings coaxially within the compressor-turbine unit.

It is still another object of this invention to provide means for engaging and disengaging the aforesaid hysteresis drive or eddy-current clutch responsive to inertial reversals of torque between the motor drive and driven compressor rotor or turbine-compressor unit as the case may be. In practice, the eddy-current clutch is comprised of a retractile magnet drive member that slides over a driven magnetic member by means of a helix on the driving motor shaft and a nut on said driven member, as later described. Forward acceleration of the drive motor shifts the drive member over the driven member, whereas reverse deceleration of the driven member relative to the drive member by means of the overtaking turbine driven compressor rotor exceeding the speed of the motor drive thereby retracts the nut and driven member. Accordingly, the eddy-current clutch is functional during the "acceleration mode" and disfunctional during the "running mode", there being a rapid velocity change in rotational speed from low to the "limit RPM" speed and also between the "limit RPM" and subsequent higher speed of the turbine driven compressor.

SUMMARY OF THE INVENTION

It is the performance of turbochargers that is improved herein by quickly accelerating the compressor rotor in response to demand for higher induction air pressure into the internal combustion engine. It is reciprocating cylinder and piston engines with which this invention is particularly concerned, and related to a motor drive for the turbine-compressor unit, and preferably for the compressor alone. Heretofore, "unitized" turbine-compressor tubochargers have been accelerated by motor drives through direct and disengageable couplings, including overrunning couplings whereby the turbine rotor takes over the drive function when it reaches operational speed. The critical factors to be addressed are 1) There is the ultra-high RPM or rotational velocity that must be reached by the turbo-compressor unit and which requires hydrodynamic bearings or the like which are non-precision sleeve bearings on a fixed axis X resulting in a turboshaft that "floats" radially on a centrifugally centered axis Z. 2) There is the high RPM or restricted "limit RPM" of the electric motor drive, due principally to structural forces exerted by the heavy magnet mass of the rotating member. 3) There is the criticality of the motor shaft concentricity requiring precision bearings on a fixed axis Y, also restricted to the "limit RPM" of the electric motor drive. 4) There is the beneficial reduction of the critical mass to be accelerated, namely the compressor rotor journaled independently of the turbine rotor and on non-precision bearings, and addressed herein as a mass separate from the turbine rotor. And 5) There is the isolation of the electric motor drive from the exhaust heated turbine section of the turbocharger, and its placement in the intake duct for disipation of heat therefrom.

In accordance with this invention the turbocharger is of normal size and appearance, having a turbine section connected from the engine exhaust manifold, and a compressor section connected into the engine intake manifold. However, the air inlet into the compressor section is enlarged to accommodate the air cooled auxiliary electric motor drive. An unobvious structural and functional feature herein disclosed is the separation of rotational axes of the compressor rotor and the auxiliary electric motor drive therefor, by means of a mechanically separated coupling means. In practice, said mechanically separated coupling means is a hysteresis drive or eddy-current clutch with substantial interface clearance for transmitting torque by means of electromotive force. Accordingly, there is a fixed turbine-compressor axis X concentric with a separate fixed motor drive axis Y, the former journaled on spaced non-precision sleeve type hydrodynamic bearings, and the latter journaled on spaced precision ball bearings. And in accordance with this invention there is an independent compressor rotor or turbine-compressor unit "mass centered axis" Z described herein as a "float" axis.

An advantageous phenomenon takes place as the mass of the turbine-compressor unit accelerates from zero speed to operational speeds, during which it may first wobble with erratic radial displacements until centrifugal forces inherently stabilize the mass on its center of gravity, whereupon the "floating" axis Z assumes stability. During the interim there may be erratic but non-damaging motion culminating in rotation on said mass centered "floating" axis Z (there being no detrimental mechanical engagement).

Response time is of the essence, and to this end the masses of the turbine rotor and compressor rotor are free of each other during the "acceleration mode". In practice, the turbine rotor is carried by a quill journaled within the tubular shaft of the compressor rotor by precision needle bearings, there being an overrunning clutch operating to drive the compressor shaft from the quill coupled to the turbine rotor. Accordingly, the compressor rotor per se "floats" in the non-precision bearings so as to be centrifugally centered as part of the turbine-compressor unit mass, the driven element of the coupling being carried by said compressor rotor. It is to be understood that, reversibly, the compressor rotor can be carried by a quill journaled within the tubular shaft of the turbine rotor.

A feature of this invention is the automatic inertia controlled eddy-current coupling utilizing inertia inherent in the driven element of the coupling to cooperate with the drive element when the motorized drive element accelerates, and to disengage the same when the turbine drive accelerates above the speed of said motor drive. Accordingly, the eddy-current coupling is functinal during the "acceleration mode" and is disfunctional during the turbine "running mode".

A summary objective of this invention is to successfully transmit torque from a high speed auxiliary electric motor drive rotating on precision bearings to an ultra-high speed turbocharger rotating on non-precision hydrodynamic bearings, all without damage to a disengageable coupling therebetween. The drive coupling member is affixed on an axis Y to the motor shaft centered on spaced precision ball bearings, and the driven coupling member is affixed to the turbcharger rotor on an axis X' that shifts radially within the clearance limits of spaced non-precision hydrodynamic sleeve bearings, and said precision and non-precision bearings are fixed separately on an axis X common with axis Y. As later described, infinitesimal center of gravity imbalance inherent in the rotating mass of the turbine-compressor rotors results in a distinct "floating" axis Z radially displaced from the precision axis X' of the compressor and turbine rotor. The turbocharger floating in said hydrodynamic bearings has radial clearance permitting substantial but limited radial motion. Therefore and in accordance with this invention a coupling means is provided for clearance that permits unrestricted eccentric motion of the driven coupling member affixed to the turbocharger. A feature is the magnetic coupling devoid of mechanical engagement. A characteristic of magnetic couplings is that when one member is restrained from rotation the other member continues to produce a torque effect that consumes power. Since the ultra-high RPM tubocharger capability far exceeds the high RPM motor drive capability, control means is provided for disengaging said magnetic coupling by turning "OFF" or by retracting said magnetic forces when turbocharger RPM exceeds the auxiliary electric motor drive limit RPM.

The foregoing and various other objects and features of this invention will be apparent and fully understood from the following detailed description of the typical preferred forms and applications thereof, throughout which description reference is made to the accompanying drawings.

THE DRAWINGS

FIGS. 9 through 13 are diagrammatic views illustrating the dynamic axes relationships that characterize this invention;

Figure 9:
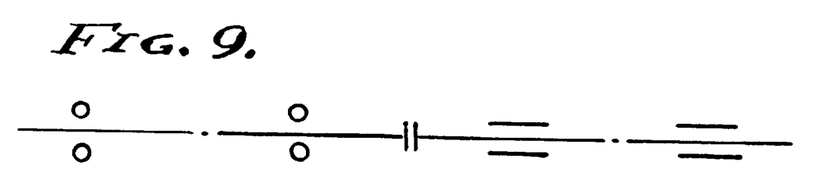
FIG. 9 showing the separation of coaxial fixed axes X and Y employing non-precision and precision bearings respectively.

PREFERRED EMBODIMENT:

Referring now to the drawings, this motor assisted turbocharger is characterized by a bearing frame F and a compressor-motor drive casing G, matched and line bored for fixed precision alignment on separate fixed axes X and Y. Hydrodynamic non-precision sleeve bearings are used on axis X for Ultra-High Speed rotation of the turbocharger unit, whereas precision ball bearings are used on axis Y for High Speed rotation of the auxiliary electric motor drive. The compressor shaft S is machined to have its own precision axis X' (see FIG. 9) for a theoretical center of rotation and concentric affixing of the driven coupling member for the motor drive, concentric with its designed center of gravity closer than the radial clearance of the hydrodynamic bearings operating on fixed axis X.

Figure 10:
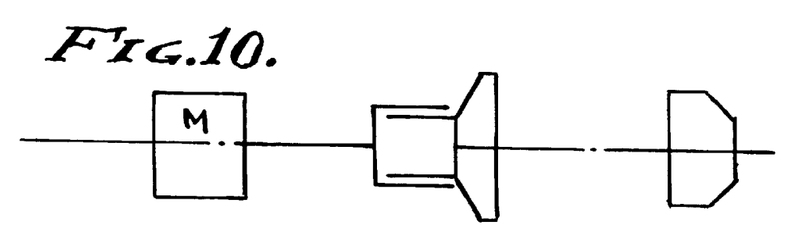
FIG. 10 showing the mechanical separation of the coupling members.
Figure 11:
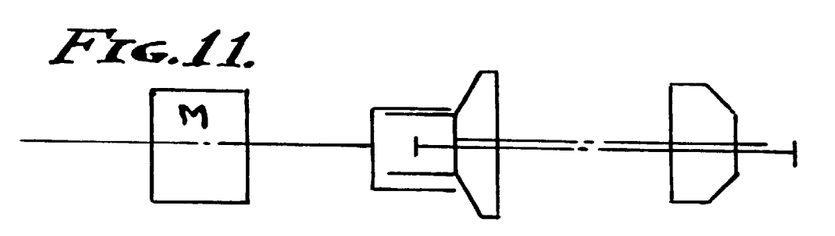
FIGS. 11 and 12 showing typical displacements of axis X' by "floating" axis Z.
Figure 12:
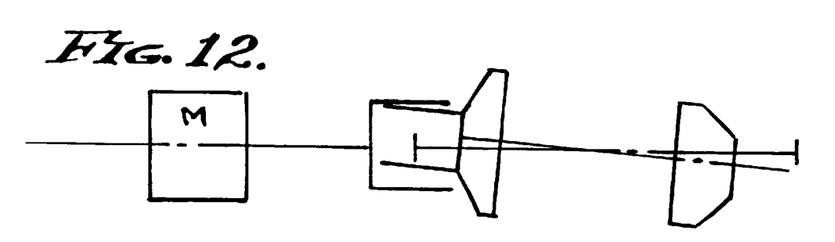
Figure 13:
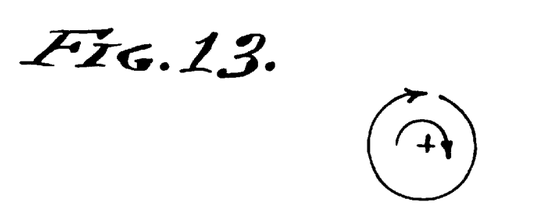
FIG. 13 showing the eccentric effect of axis X' cycling around floating axis Z.

The hydrodynamic bearings are comprised of male trunions rotating with said precision axis X', and coaxially spaced female sleeves fixed on the axis X. A dynamic phenomenon occurs operationally causing infinitesimal but serious axis shifts of the ultra-high speed rotating mass, as a result of slight inaccuracy and distortion from stress due to centrifugal pressures, torsional strain and thermal generated forces. Consequently, the rotating mass will inherently seek equilibrium on a distinct "floating" axis Z (see FIGS. 10 and 11) coincidental with its shifting center of rotation as it moves relative to the aforesaid machined precision axis X', thereby forcing said axis X' to cycle eccentrically about said fixed axis Z (see FIG. 12) at the speed of its rotation; thus establishing the potentially damaging phenomenon addressed herein. Note that the radial bearing clearance on axis X is greater than the potential shift of the center of rotation of the displaced rotating mass, and that the assumed floating axis Z may or may not be parallel to the physical axis X' or to the fixed axis X (again see FIGS. 10 and 11).

Figure 1:
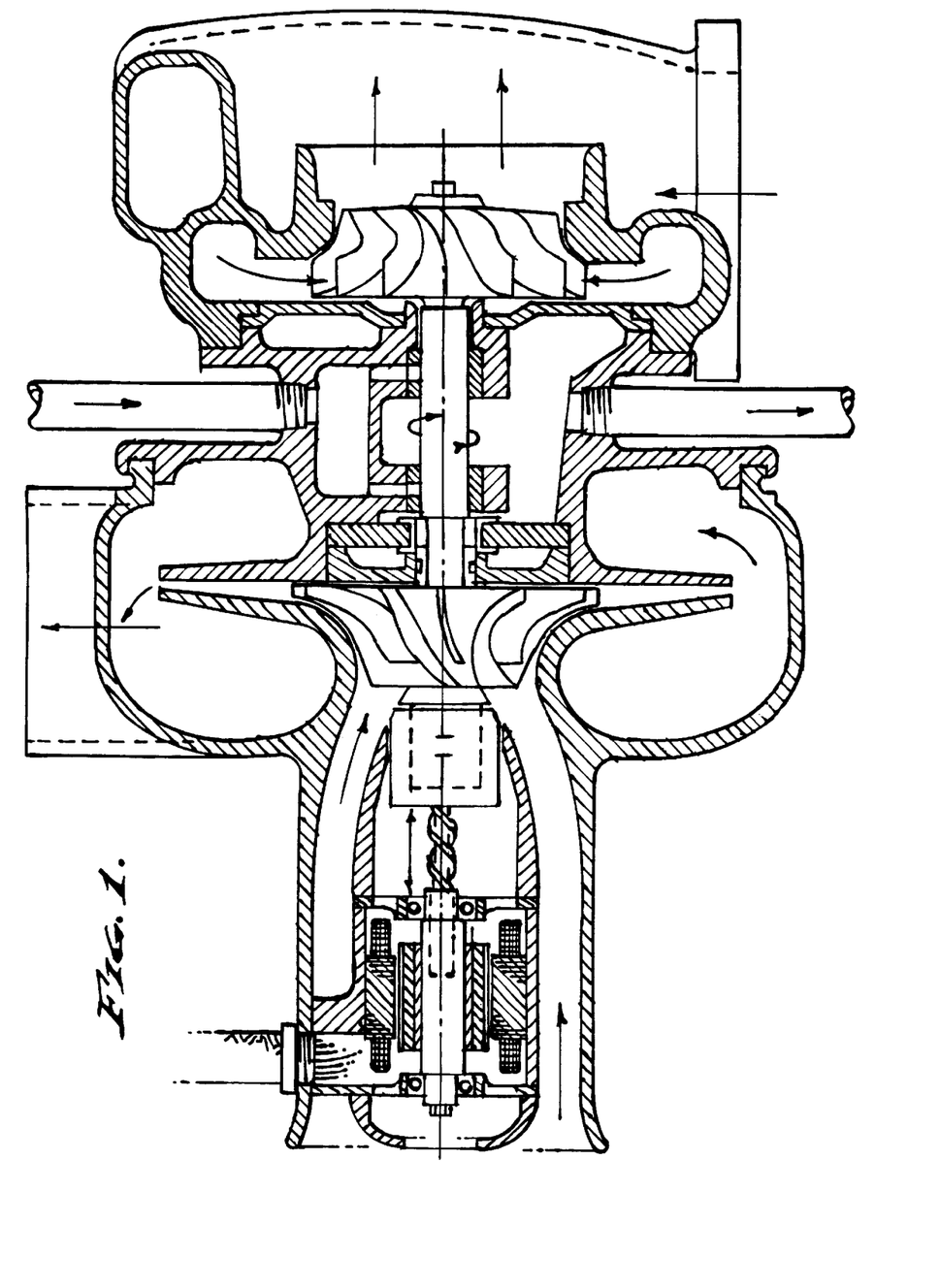
FIG. 1 is a longitudinal sectional view of a turbocharger of the present invention with a motor assisted compressor and mechanically disengagable coupling.

Referring now to FIG. 1 of the drawings, the bearing frame F rotatably carries the turbocharger shaft S on a fixed axis X by means of a pair of axially spaced hydrodynamic sleeve bearings 10 and 11 having, for example, 0.005 to 0.008 inch radial clearance; thereby permitting the shaft S to "float" as it seeks its axis Z of rotation. The shaft S is powered at one end by an engine exhaust driven turbine rotor T that receives exhaust gases through a surrounding scroll 13 and processed by rotor blades 14 for centripetal reaction followed by discharge from a coaxial exhaust opening 15. The shaft S powers a compressor rotor P at its other end that receives inlet air through a coaxial opening 16 and processed by rotor blades 17 for centrifugal reaction and radial discharge through a compressor scroll 18, as compressed engine induction air.

As shown in FIG. 1, the rotor mass may be comprised of integrally connected rotors T and P and the shaft S for use in "Locked Impeller" turbochargers operating at tolerable rotational speeds; RPM being limited by bearing durability. However, for use in "Free -Clutched Impeller" turbochargers operating at ultra-high rotational speeds it is desirable to uncouple the compressor rotor P from the turbine rotor T in order to rapidly accelerate the rotor P for establishing instantaneous pressurization of engine induction air on demand; prior to acceleration of the turbine rotor T, thereby defeating the so-called "Turbo-Lag". Accordingly, the shaft S is separated into two shaft members, one rotatably carrying the turbine rotor T, and the other rotatably carrying and driving the compressor rotor P (compare FIGS. 2 and 4). In each embodiment of shaft separation, releasable clutch means R is provided for driving the compressor rotor P from the turbine rotor T(see FIGS. 3 and 5).

In accordance with this invention, the compressor rotor P is accelerated by auxiliary drive means D, preferably an electric motor drive on fixed axis Y and with a motor shaft 22 carried on a pair of axially spaced precision anti-friction bearings 20 and 21, for example ball bearings with 0.0001 to 0.0005 inch concentricity; thereby holding the motor shaft 22 on said fixed axis precisely coincidental with fixed axis X. As shown, the casing G has an axially extending motor housing 23 within a concentrically surrounding air intake duct 24, establishing an annulus 25 opening into the coaxial air induction opening 16 and through the blading 17 of compressor rotor P.

A feature of this invention is the direct coupling to the compressor rotor T by a mechanically disengaged coupling means and preferably by a hysteresis clutch H as shown throughout the drawings. In practice, the drive member 30 of clutch H is affixed to the motor shaft 22, and the driven member 31 of clutch H is affixed to the compressor rotor P. And there is a "Locked Impeller" embodiment for lower speed turbochargers, wherein the compressor rotor P is separated from the turbine rotor T by a releasable clutch means and wherein the driven compressor rotor P remains coupled directly to said motor shaft as in FIG. 1. However and in accordance with this invention as shown throughout the drawings, and especially for smaller ultra-high speed turbochargers, the clutch drive is operable to uncouple the motor shaft; 22 from the compressor rotor P, as will be described.

Referring now to the auxiliary electric motor drive D, the housing 23 therefor is supported within the duct 24 by means of at least one and preferably a spider arrangement of three struts 32, turned peripherally at 33 to precisely fit into a cylindrical bore 34 of said duct, and secured by fasteners 35. The at least one strut 32 is provided with a radial access opening 36 to accomodate electrical conductors for power and commutation control of the motor armature 37. The motor field is comprised of permanent magnets 38 fixed to the motor shaft 22 with embracing field laminates, and all of which is contained within a sleeve 39 for high speed rotation. Motor cooling is by means of air circulation drawn through a bell-housing at the intake end, through the motor end plates, and through and from the elongated drive-end bell housing surrounding the clutch H.

Figures 2, 3:
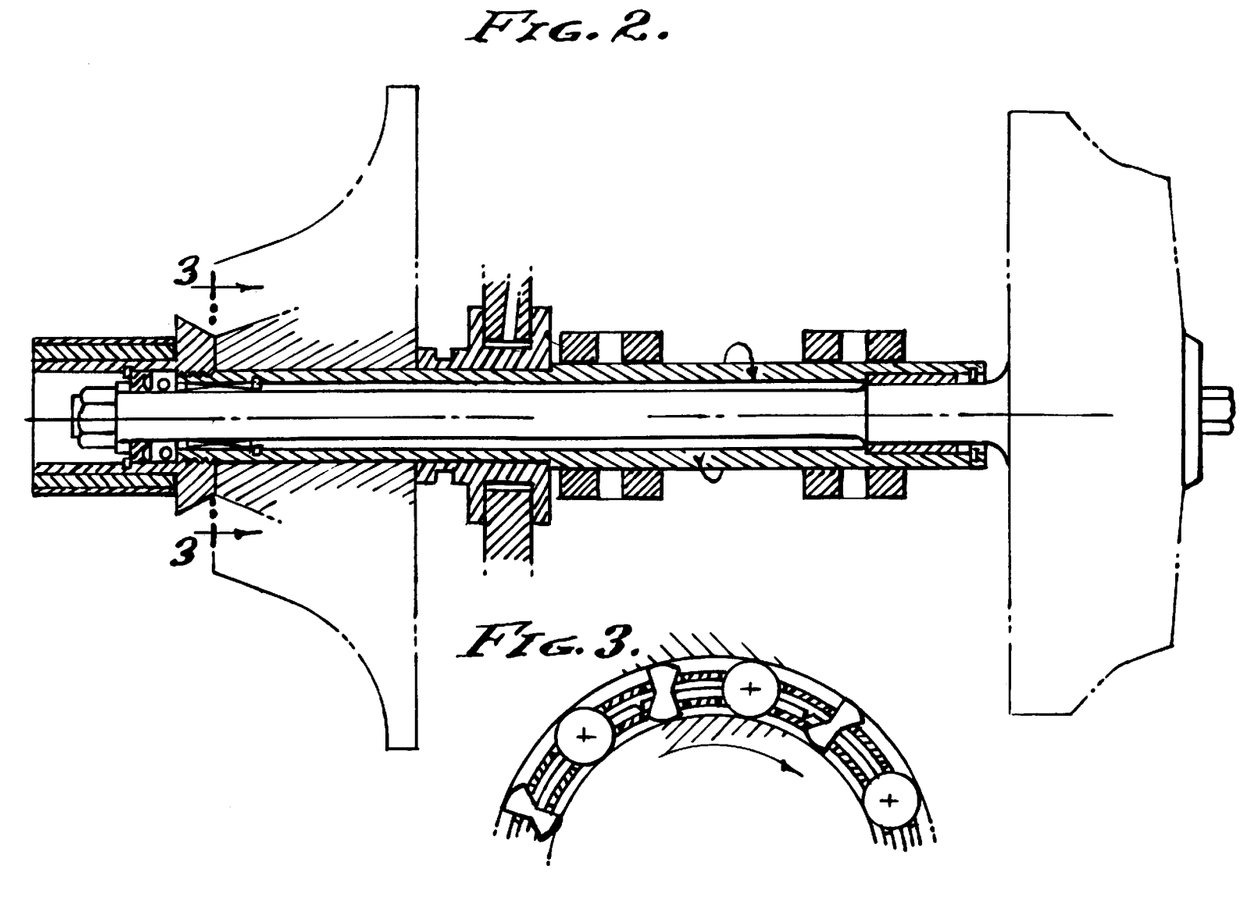
FIG. 2 is an enlarged longitudinal sectional view of the turbo-compressor unit mass, illustrating attachment of the driven coupling member to the compressor, and showing the over-running feature of the unit.
FIG. 3 is an enlarged detailed fragmentary view of the overruning clutch, taken as indicated by line 3—3 on FIG. 2.

Referring now to FIG. 2 of the drawings, the combined mass inertia of the turbine rotor T and the compressor rotor P together with the shafting therefor is separated into independently rotatable masses with the releasable clutch means R operable to drivably couple the turbine rotor T to the compressor rotor P. In this "Free Clutch Impeller" embodiment the turbocharger shaft S is the compressor rotor shaft directly journaled in the non-precision hydrodynamic sleeve bearings 10 and 11, thereby restricting radial displacement of the precision axis X' to the radial bearing clearance of said 0.005 to 0.008 inch. And, the turbine rotor shaft is a quill 40 concentrically journaled on spaced precision bearings 41 and 42 carried by and within the tubular shaft S. In practice, the bearing 41 is a precision radial and axial thrust anti-friction ball bearing positioned at the inlet end of shaft S by a retainer 43 and seal 44. The bearing 41 can be concentric within 0.0001 to 0.0005 inch. The bearing 42 is a close tolerance high temperature sleeve bearing positioned at the high temperature turbine end of shaft S to rotatably carry the shaft or turbine quill 40 that extends coextensively through the tubular shaft S and positioned axially by the precision thrust bearing 41 fixed against the low temperature compressor end of the shaft S by a nut 45 threadedly engaged thereto to axially position the turbine rotor T. And, the body of driven member 31 is threadedly engaged onto the exterior end portion of shaft S to engage and secure and axially position the compressor rotor P. Accordingly, the turbine rotor T and quill 40 are free to rotate relative to the tubocharger-compressor shaft S. The annulus between the shaft S and the quill 40 is packed with a high temperature lubricant retained by seals. The high temperature sleeve bearing 42 is positioned by a retainer 46 and seal 47. And included on the shaft S assembly is a shaft seal 48 at the compressor rotor, a main thrust bearing 49, and etc., the aforesaid components of the separably combined turbine-compressor and shafting are precision machined and dynamically balanced about the axis X' forming a compressor mass rotatably independent from a turbine mass.

Referring now to the releasable clutch means R, the compressor rotor P is free to accelerate independently and ahead of the turbine rotor T, and is driven by the rotor T only when angular velocity of the rotor T reaches and tends to exceed that of the rotor P. As a result of the aforesaid mass inertia separation of the two rotors P and T, the acceleration of the compressor rotor is in no way impeded by the inherently retarded acceleration of the turbine rotor. The releasable clutch means R is positioned within the annulus between the shaft S and quill 40 at the cool air inlet zone by a retainer 57 and is an automatic clutch and preferably an overrunning Sprague clutch as shown in FIG. 3 wherein drive members 50 articulate between an inner race 51 of the compressor shaft S and an outer race 52 of the turbine quill 40. The drive members 50 are wedge-shaped blocks with inner and outer convex faces disengageable with races 51 and 52, and positioned by circumferentially shiftable lantern rings 53 and 54 which also control spacing of roller bearings (or needle bearings) 55 that maintain concentricity of the races 51 and 52. It is to be understood that the clutch R structure can vary widely as circumstances require, whereby the compressor shaft S is adapted to rotate freely ahead of the turbine shaft or quill 40, and alternately to be driven by the turbine as and when the turbine rotor T applies torque to the compressor rotor P. A feature of this invention is that the rotational RPM differential between the compressor shaft P and turbine quill 40 never exceeds said limit RPM of the auxiliary electric motor drive D, as will be described with respect to the mechanically disengaged coupling means H.

Figures 4, 5:
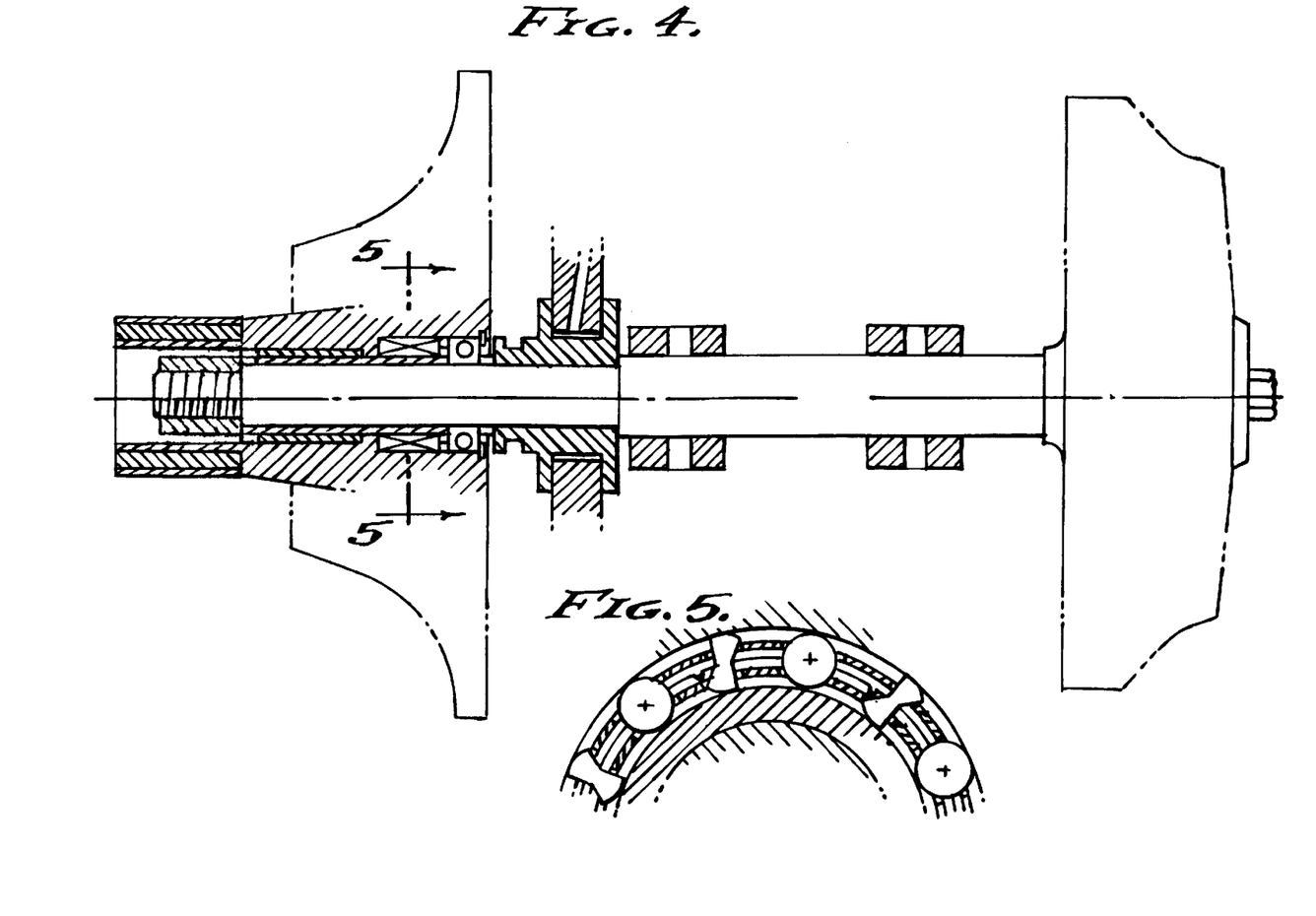
FIG. 4 is an enlarged longitudinal sectional view of the turbine-compressor unit mass, illustrating an aftermarket embodiment of the driven coupling member to the compressor, and the overrunning feature applied directly to the compressor rotor without change to the turbine rotor and shaft.
FIG. 5 is an enlarged detailed fragmentary view of the overruning clutch taken as indicated by line 5—5 on FIG. 4.

Referring now to FIG. 4 of the drawings, the combined mass inertia of the turbine rotor T' and the compressor rotor P' together with the shafting therefor is separated into independently rotatable masses with the releasable clutch means R' operable to drivably couple a state of the art turbine rotor T' to an aftermarket compressor rotor P' without modifying the former. In this "Free Clutch Impeller" embodiment the turbocharger shaft S' is the turbine rotor shaft directly journaled in the non-precision hydrodynamic sleeve bearings 10 and 11, thereby restricting radial displacement of the precision axis X' to the radial bearing clearance of said 0.005 to 0.008 inch. And, the compressor rotor P' is directly journaled on spaced precision bearings 41' and 42' carried by the single turbocharger shaft S'. In pracitce, the bearing 41" is a precision radial and axial thrust anti-friction ball bearing spaced from the end of shaft S' and against seal 48 by a spacer sleeve 46' positioned over the end of shaft S' by a nut 45' and keyed to said shaft. The driven coupling member 31' is integral with the hub of the compressor rotor P' as shown. The sleeve 46' extends from nut 45 to engage and axially position the axial thrust bearing 41'. A retainer 43' positions the compressor rotor P' axially against the clutch R ' as will be described. The bearing 41' can be concentric within 0.0001 to 0.0005 inch. The bearing 42' is a close tolerance sleeve bearing rotating on the sleeve 46' and positioned at the low temperature zone of shaft S' to rotatably carry the compressor rotor P'. The sleeve 46' carries bearing 42' and is positioned axially by the precision thrust bearing 41'. The compressor P' is free to rotate relative to the turbocharger shaft S'. The annulus between the shaft S' and the compressor rotor P' can be packed with lubricant. The precision bearing 42' operates over sleeve 46' within a counterbore race 51' of rotor P'. And included on the shaft S' assembly is the shaft seal 48 at the compressor rotor, a main thrust bearing 49, etc., the aforesaid components of the separately combined turbine-compressor and shafting are precision machined and dynamically balanced about axis X' forming a compressor mass rotatably independent from a turbine mass.

Referring now to the releasable clutch means R', the compressor rotor P' is free to accelerate independently and ahead to the turbine rotor T' as hereinabove described, and is driven by the rotor T' only when angular velocity of the rotor T' reaches and tends to exceed that of the rotor P'. The releasable clutch means R' is positioned within a counterbore race 51' of the compressor rotor P' and over the shaft S' at the cool zone, and is an automatic clutch and preferably an overrunning Sprague clutch as shown in FIG. 5 wherein wedge members 50' articulate between the inner rotor race 51' and an outer race 52' of the sleeve 46'. The wedge members 50' are block-shaped with inner and outer convex faces disengageable with races 51' and 52', and positioned by circumferentially shiftable lantern rings 53' and 54' which also control spacing of roller bearings (or needle bearings) 55' that maintain concentricity of the races 51' and 52'. It is to be understood that the clutch R' structure can vary widely as circumstances require, whereby the compressor shaft S' is adapted to rotate freely ahead of the turbine shaft S', and alternately to be driven by the turbine as and when the turbine rotor T' applies torque to the compressor rotor P'. A feature of this invention is that the rotational RPM differential between the compressor shaft P' and turbine shaft S' never exceeds said limit RPM of the auxiliary electric motor drive D, as will be described with respect to the mechanially disengaged coupling means H.

Referring now to the hysteresis eddy current coupling means H, it is a primary object of this invention to mechanically separate the rotating mass of the turbocharger from the auxiliary electric motor drive D. It is to be understood that equivalent prime movers can be substituted for said motor drive D. Accordingly, an advantageous feature of this invention is the magnitude of peripheral separation between the drive member 30 and the driven member 31 of the hysteresis clutch H. As shown, the clutch H geometry is cylindrical, comprised of the female member 30 coextensively surrounding the male member 31 with radial clearance therebetween of for example 0.020 to 0.025 inch. Therefore, since the radial displacement of the axis X' can be no more than 0.005 to 0.008 inch, there can be as much as 0.012 to 0.020 inch clearance; all of which is controlled with manufacturing tolerances as circumstances require.

The drive member 30 is fixed directly (for low speed operation) or indirectly (for high speed operation) to the motor shaft 22, having an inner diameter wall 60 concentric with and surrounding the outer diameter wall 61 of the driven member 31. In practice, the drive member is cup-shaped and rotates on the fixed axis Y; while the driven member 31 is essentially a cylindrical solid and rotates on either the precision axis X' or ultimately on the floating axis Z. Accordingly, the axes Y and X' or Z are not always or are they necessarily concentric. And, quite to the contrary they are known to become substantially eccentric, and structurally damaging.

The, hysteresis eddy current effect is provided by the drive member 30 of cylindrical cup configuration and driven member 31 of cylindrical configuration. Drive member 30 has an inner diameter wall comprised of a series of North and South pole magnets 62 constrained within a ferrous or iron ring 63 which conducts the magnetic flux loops from pole to pole. The driven member 31 has an outer diameter wall comprised of a copper sleeve 64 within which a ferrous or iron core is constrained. A feature of this invention is the direct affixation of the iron core of driven member 31 to the turbocharger shaft S (S') as a part integral with the body of the driven member 31. The drive member 30, when protracted, forms the inner diameter of the air inlet into the compressor rotor.

The hysteresis eddy current coupling H as above described is comprised of a rotating magnetically polarized drive member 30 (a rotating field) operating concentrically over a nonmagnetically polarized core driven member 31. The polarized member 30 has a circumferential series of high flux permanent magnets. The copper sleeved core member 31 becomes alternately magetized by electric currents induced according to the passing magnetic flux of the polarized member 30. These recurring electrical currents are the eddy currents from which magnetic flux emanates and couples to the polar flux of the polarized member 30, producing a torque reaction between the two rotating members. Torque reaction is determined by the relative velocity between the two flux fields of said members, reaching a predictable "slip" velocity and the torque lower than maximum. Heat generated as a result at sleeve 64 is dissipated from said sleeve into the core member 31 attached to the compressor rotor acting as a heat sink in the intake air flow. Diagrammatically in FIG. 7, maximum torque is reached rapidly relative to slip increase, after which torque diminishes slowly. Accordingly, torque transmission response is rapid.

Figures 6, 7:
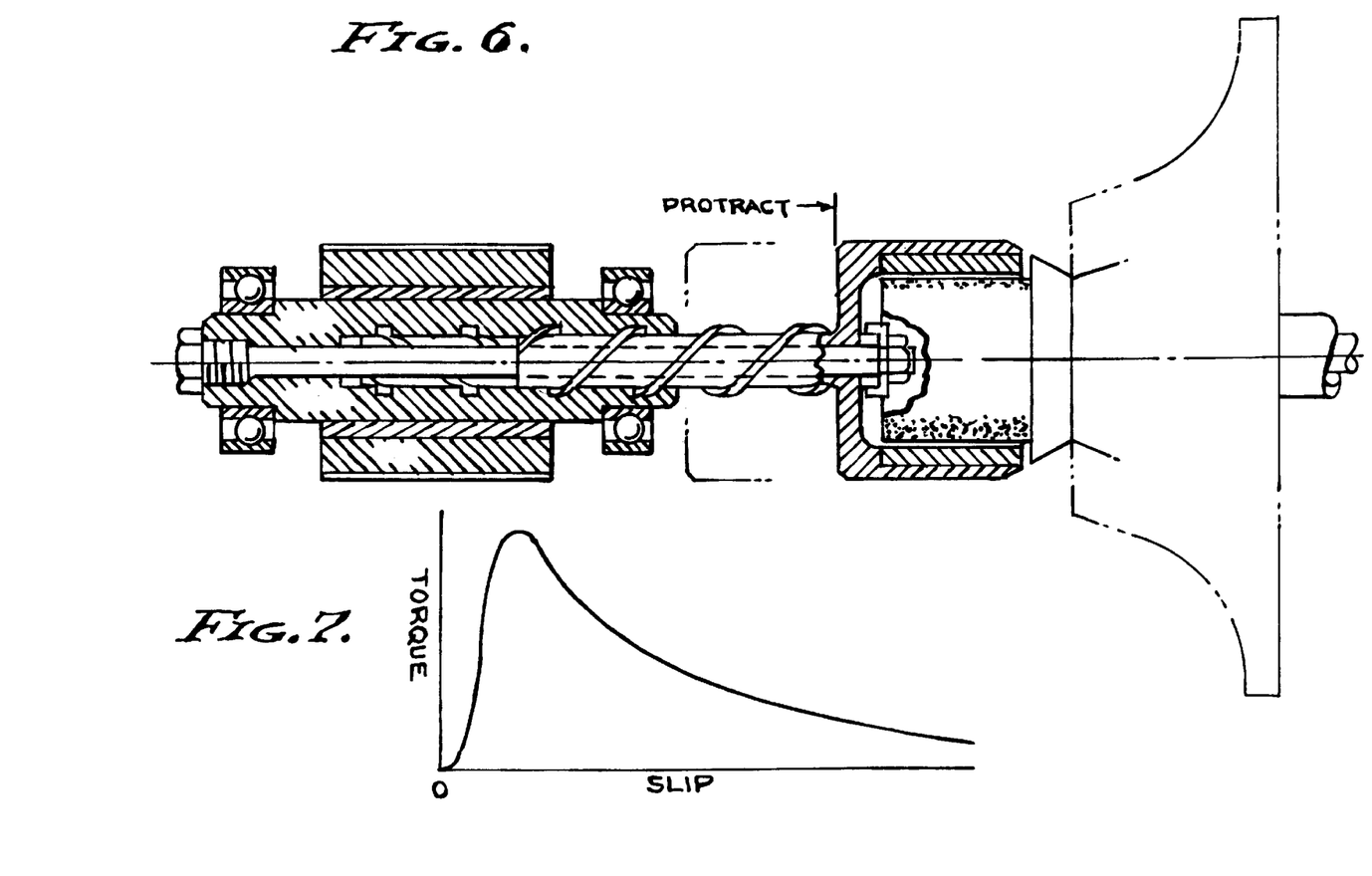
FIG. 6 is an enlarged longitudinal sectional view of the motor assist drive and mechanically disengaged coupling protracted into its acceleration mode driving the compressor rotor.
FIG. 7 is a typical torque vs. slip performance diagram pertaining to the hysteresis eddy-current clutch that characterizes this motor assisted drive.

Referring now to FIG. 6 of the drawings, the hysteresis eddy current coupling H is disengageably coupled to the motor shaft 22 by an inertially responsive control means C for activating and de-activating said coupling H. That is, for engaging the coupling members 30 and 31 responsive to acceleration of the motor M and its shaft 22, and alternately for disengaging the coupling members 30 and 31 responsive to acceleration of member 31 in excess of the limit RPM of the motor M and its shaft 22. In accordance with this invention, the drive member 30 is supported by a drive shaft 65 rotatably and reciprocally carried by the motor shaft 22 on the fixed axis Y. A feature is the screw engagement of shafts 22 and 65 for reciprocal motion of the drive member 30 responsive to change in the relative angular motion of said two shafts.

Facing the turbocharger, there are left hand screw threads 66 opening forwardly at the front bearing 21 end of the shaft 22, and the drive shaft 65 has coextensive screw threads 67 complementary thereto. In practice, said screw threads are loosely fitted double pitch threads as shown. Rotational concentricity of drive shaft 65 within the motor shaft 22 is maintained by a concentric stem 68 rigidly carried by the base end of shaft 22 and rotatably and slidably extending through the drive shaft 65, employing a precision. sliding fit.

In accordance with this invention, mass inertia of the drive member 30 and drive shaft 65 when subjected to right hand acceleration of the motor shaft at greater velocity than the coupling drive shaft 65 automatically screws its drive shaft forwardly for protracting the drive member 30 over the driven member 31. Conversely, mass inertia of the drive member 30 and drive shaft 65 when subjected to left hand acceleration of the coupling drive shaft 65 at greater velocity than the motor shaft 22 automatically screws said drive shaft rearwardly for retracting the drive member 30 from the driven member 31.

A snubber means N is provided, comprised of a protraction snubber 69 carried by the forward end of a centering stem 68 slidable through the drive shaft 65 to retard and stop forward travel of the drive member 30. And retraction snubber 70 carried within the back end of shaft 22 to retard and stop rearward travel of the drive shaft. The centering stem 68 is fixedly anchored to the rear end of the motor shaft 22 so as to project centrally therethrough as shown. Rotational damping is a result of said reciprocal snubbing, threaded interengagement remaining free at the ends of travel. Accordingly, the protraction and retraction of drive member 30 relative to the driven member 31 of coupling H is automatic, by providing an inertially controlled electromagnetic coupling devoid of mechanical interengagement, thereby ensuring coupling drive for acceleration of the compressor P as well as ensuring coupling disengagement when the compressor rotor exceeds the limit RPM of the auxiliary electric motor drive D.

Figure 8:
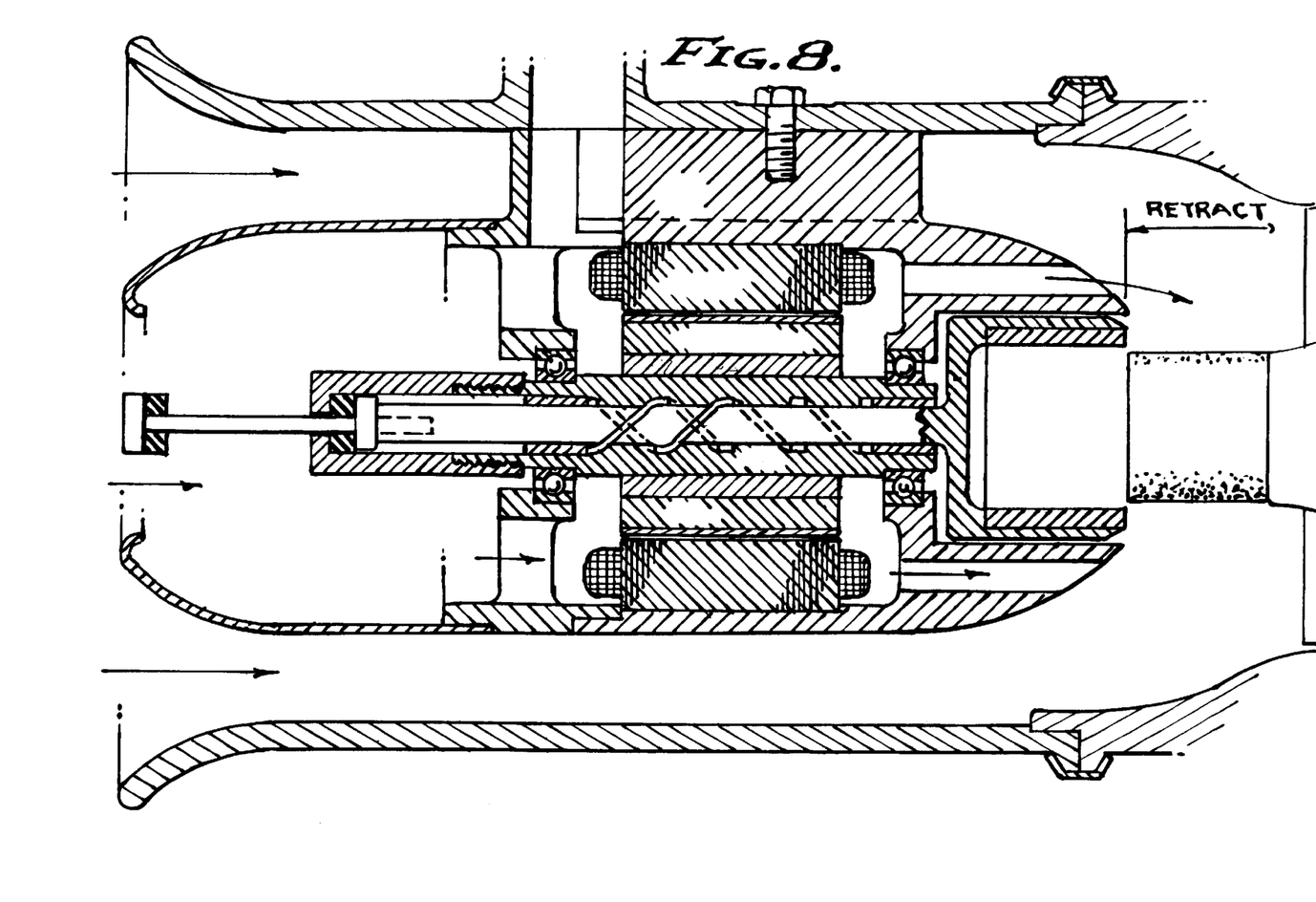
FIG. 8 is an enlarged detailed longitudinal sectional view similar to FIG. 6, illustrating a preferred aftermarket embodiment in its retraction mode.

Referring now to the preferred embodiment shown in FIG. 8 or the drawings, the hysteresis eddy current coupling H is as hereinabove described, disengageably coupled to the motor shaft 22' by an inertiallly responsive control means C' for activating and de-activating said coupling. In accordance with this embodiment, the motor shaft 22' is carried on the precision bearings 20 and 21, and the drive member 30 is directly supported by the drive shaft 65' rotatably and reciprocally carried by spaced precision bushings 71 and 72 supported at opposite terminal ends of the shaft 22'. As in the first embodiment, a feature is the screw interengagement of shafts 22' and 65'. However, another feature of this embodiment is confinement of the mass inertia control means C' within the motor shaft 22', and the extension of said shaft 65' from both the front and back of said shaft 22'. Accordingly, the shafts 22' and 65' threadedly interengage, and the drive member 30 of coupling means H is drivably fixed to the distal front end of shaft 65', while the snubber means is fixed to extend from the distal back end of shaft 65'. Again, reciprocal motion of the drive member 30 is responsive to change in the relative angular velocity of said two shafts 22' and 65'.

In accordance with this preferred embodiment and facing the turbocharger, there are left hand screw threads 66' extending coextensively' through the shaft 22' and opening forwardly and rearwardly thereof. And, the drive shaft 65' has a short central "nut" section with complementary screw threads 67' to threadedly operate in said shaft threads 66'. In practice, said screw threads are loosely fitted double pitch threads as shown. Rotational concentricity of drive shaft 65' within the motor shaft 22' is determined by the precision bushings 71 and 72, the drive shaft 65' rotatably and slidably extending through and/or from the motor shaft 22' on the fixed precision axis Y.

As hereinabove described, and also with this embodiment of the invention, mass inertia of the drive member and shaft when subjected to acceleration of the motor shaft at greater velocity than the coupling drive shaft automatically screws and protracts said drive member over the driven member of the coupling. Conversely, acceleration of the coupling drive shaft at greater velocity than the motor shaft automatically screws and retracts said drive member from the driven member of the coupling.

In this preferred embodiment, the snubber means N' is external of the motor M, and is comprised of a stem 68' that projects rearwardly from the back exposed distal end of the drive shaft 65'. The drive member 30 is carried by the front distal end of the drive shaft 65', the screw thread 67' and drive member 30 being spaced as shown for coupling disengagement. Accordingly, a protraction snubber 69' is carried by the rearward end of stem 68' to retard and stop forward travel of the drive member 30. And, a snubber 70' is carried by the forward end of stem 68' to retard and stop rearward travel of the drive member 30 as shown. Terminal end stops 73 and 74 are carried by opposite ends of stem 68' for receiving inertial force at the end of driver travel. And, the inertial force applied is sustained by a header 75 of a cap 76 affixed to and to turn with the shaft 22'. Rotational damping is a result of said reciprocal snubbing, threaded interengagement remaining free at the ends of travel. Accordingly, the protraction and retraction of drive member 30 relative to the driven member 31 of coupling H is automatic, by providing an inertially controlled electromagnetic coupling devoid of mechanical engagement, thereby ensuring coupling drive for acceleration of the compressor P as well as ensuring coupling disengagement when the compressor rotor exceeds the limit RPM of the auxiliary electric motor drive D.

SUMMARY

The several embodiments of this invention as hereinabove described operate, generally, as follows:

Assuming that the turbine is at a standstill and/or the internal combustion engine idling so as to have little or no exhaust, there being no torque demand on the engine, and that the auxiliary electric motor drive is de-energinzed, the eddy current coupling may or may not be retracted but is ineffective, and the overrunning clutch is automatically ready to release or drive the compressor. When there is an engine acceleration and/or torque demand, the motor drive is energinzed as by means of computerized control and instantaneously accelerates to its limit RPM resulting in two basic automatic effects. 1) The inertially responsive control means automatically protracts the coupling drive member over the coupling driven member affixed to the compressor, 2) which conditions the eddy current coupling to "slip" drive said compressor from the motor torque, but only up to the limit RPM capability of said motor and its precision bearings. The compressor is free to accelerate ahead of the turbine, and simultaneously the turbine is free of the compressor mass whereby its acceleration is maximized. In practice, despite retarded turbine acceleration, its momentum is gained to exceed and overtake that of the compressor resulting in two additional automatic effects; 1) The overrunning clutch picks up and drivably engages the compressor whereby ultra high velocity is attained, and 2) the velocity differential between the turbine and compressor operates the inertial responsive control means to retract the coupling drive member from the coupling driven member thereby eliminating any drag to the tubocharger from the motor, the turbocharger then operating on the engine exhaust. Accordingly, the motor drive is spared the adverse affects of ultra high rotational velocity. The compressor velocity and engine induction air pressure is sensed and processed by a computer or the like for switching the motor "ON" and "OFF". And, minimum compressor velocity and engine induction air pressure are maintained as may be required by commutation control of said motordrive, as and when engine exhaust diminishes as a result of reduced engine torque demand.

Having described only the preferred forms and applications of our invention, we do not wish to be limited or restricted to the specific details herein set forth, but wish to reserve to ourselves any modifications or variations that may appear to those skilled in the art as set forth within the limits of the following claims.

I claim:

1. A motor assisted turbocharger for employing residual exhaust engery from and to increase air induction pressure into internal combustion engines, and including;

a compressor rotor and a turbine rotor on a first bearing means for rotation on a fixed axis, a motor drive on a second bearing means for rotation on a fixed axis separate from and aligned with said first axis, the first bearing means having greater radial clearance that the second bearing means whereby the combined rotar mass seeks a floating axis of rotation distinct from the axis of the second bearing means, and a coupling means between the motor drive and the compressor rotor for transmitting torque therebetween devoid of mechanical interengagement and comprised of a drive member fixed to the motor drive and spaced from a drive member fixed to the compressor rotor a distance greater than radial displacement of said floating axis.

2. The turbocharger as set forth in claim 1, wherein the coupling means is of cylindrical configuration comprised of a female member fixed to the motor drive and surrounding the periphery of the male driven member fixed to the compressor rotor.

3. The turbocharger as set forth in claim 1, wherein the coupling means is an eddy current hysteresis slip coupling of cylindrical configuration comprised of a magnetically polarized field member and a concentric non-polarized core member, the polarized field member being of female cylinder form surrounding the non-polarized male member of cylinder form with radial clearance.

4. The turbocharger as set forth in claim 1, wherein the coupling means is an eddy current hysteresis slip coupling of cylindrical configuration comprised of a magnetically polarized female member of cylinder form fixed to the motor drive, and a non-polarized male member of cylinder form fixed to the compressor rotor, the female rotor surrounding the male member with radial clearance greatrer than radial displacement of said floating axis.

5. A motor assisted turbocharger for employing residual exhaust energy from and to increase air induction pressure into internal combustion engines, and including;

a compressor rotor carried by a shaft on a first bearing means for rotation on a fixed axis, and a turbine rotor carried by said shaft for driving said compressor rotor, a motor drive on a second bearing means for rotation on a fixed axis separate from and aligned with said first axis, the compressor rotor and turbine rotor being comprised of independently rotatable masses, there being a third bearing means for rotation therebetween, releasable clutch means for driving the compressor rotor free of the turbine rotor and alternately with the turbine rotor, and coupling means between the motor drive and compressor rotor for transmitting torque therebetween devoid of mechanical interengagement and driving the compressor rotor free of the turbine rotor.

6. The turbocharger as set forth in claim 5, wherein the releasable clutch means is an overrunning clutch means for driving the compressor rotor with the turbine rotor and for release of the compressor rotor from the turbine rotor when driven at a velocity exceeding that of the turbine rotor, whereby the compressor and turbine rotor masses are independently accelerated.

7. The turbocharger as set forth in claim 5, wherein the releasable clutch means is an overrunning clutch means for response to the relative direction of rotative force between the compressor rotor and the turbine rotor, and comprised of drive members free to disengagably articulate in an annulus between a drive race driven by the turbine rotor amd a driven race driving the compressor rotor, whereby the compressor and turbine rotor masses can be indpendently accelerated.

8. The turbocharger as set forth in claim 5, wherein the turbine rotor is carried on a quill extending through the compressor shaft on said first bearing means, there being bearings at opposite ends of the compressor shaft rotatably supporting said quill, and wherein the releasable clutch means is an overrunning clutch means for response to the relative direction of rotative force between the compressor rotor and turbine rotor and comprised of drive members free to disengagably articulate in an annulus between a drive race on said quill and a driven race on said compessor shaft driving the compressor rotor, whereby the compressor and turbine rotor masses can be independently accelerated.

9. The turbocharger as set forth in claim 5, wherein the turbine rotor is carried on a quill extending through the compressor shaft on said first bearing means, there being a radial bearing at the turbine end of the compressor shaft and radial-axial thrust bearing at the opposite compressor end of said shaft and rotatably supporting and axially positioning said quill, and wherein the releasable clutch means is an overrunning clutch means positioned at the compressor end of said shaft for response to the relative direction of rotative force between the compressor rotor and turbine rotor and comprised of drive members free to disengagably articulate in an annulus between a drive race on said quill and a driven race on said compressor shaft driving the compressor rotor, whereby the compressor and turbine rotor masses can be independently accelerated.

10. The turbocharger as set forth in claim 5, wherein the turbine rotor and compressor rotor are carried on the first mentioned shaft on said first bearing means, the turbine rotor being fixed to said first mentioned shaft, there being bearings at the compressor end of said first mentioned shaft and rotatably supporting the compressor rotor independently of the turbine rotor, and wherein the releasable clutch means is an orverrunning clutch means for response to the relative direction of rotative force between the compressor rotor and turbine rotor and comprised of drive members free to disengagably articulate in an annulus between a drive race on said frist mentioned shaft and a driven race on and driving the cmpressor rotor, whereby the compressor and turbine rotor masses can be independently accelerated.

11. The turbocharger as set forth in claim 5, wherein the turbine rotor and compressor rotor are carried on said first mentioned shaft on said first mentioned bearing means, the turbine rotor being fixed to said first mentioned shaft, there being a radial bearing at the distal compressor end of said shaft and a radial-axial thrust bearing adjacent thereto and rotatably supporting and axially positioning the compressor rotor on said first mentioned shaft, and wherein the releasable clutch means is an overrunning clutch means positioned at the compressor end of said shaft for response to the relative direction of rotative force between the compressor rotor and turbine rotor and comprsied of drive members free to disengagably articulate in an annulus between a drive race on said first mentioned shaft and a driven race on and driving the compressor rotor, whereby the compressor and turbine rotor masses can be independently accelerated.

12. A motor assisted turbocharger for applying residual exhaust energy from and to increase air induction pressure into internal combustion engines, and including:

a compressor rotor and a turbine rotor on a first bearing means for rotating on a fixed axis;

a motor drive on a second bearing means for rotating on a fixed axis separate from and aligned with said first axis;

a slip coupling means between the motor drive and the compressor rotor and comprised of a drive member and a driven member for transmitting torque therebetween; and inertially responsive control means for engaging and disengaging said drive member and driven member, thereby activating and de-activating said slip coupling means, and comprised of a drive shaft free to rotate and reciprocate in a motor shaft of the motor drive and between protracted and retracted positions, there being fast pitch threaded engagement between the drive shaft and motor shaft, said drive member being carried by the drive shaft and having mass inertia for reaction on said threaded engagement causing protraction or retraction of the drive member to and from the driven member as a result of reversal of rotational velocity between the drive shaft and motor shaft;

wherein a centering stem is anchored to said motor shaft and projects through said drive shaft, the drive shaft being rotatably and slidably carried to rotate and reciprocate on the centering stem.

13. The turbocharger as set forth in claim 12, wherein there is a snubber means for arresting and stopping the drive shaft in said protracted and retracted positions.

14. the turbocharger as set froth in claim 12, wherein the coupling means is of cylindrical configuration comprised of a female drive member adapted to surround the periphery of a male member and with radial clearance, said male driven member being carried by the compressor rotor, said female drive member being carried by the drive shaft and having mass inertia for reaction on said threaded engagement causing protracton or retraction of the female drive member over and from the male driven member, there being snubber means for arresting and stopping the drive shaft in said protracted and retracted positions.

15. The turbocharger as set forth in claim 12, wherein the coupling means is of cylindrical configuration comprised of a female drive member adapted to surround the periphery of a male driven member and with radial clearance, said male member being carried by the compressor rotor, said female drive member being carried by the drive shaft and having mass inertia for retraction on said threaded engagement causing protraction of the female drive member over the male driven member for activating the coupling means or retraction of the female drive member from the male driven member for de-activating the coupling means.

16. The turbocharger as set forth in claims 12, wherein the coupling means is an eddy current hysteresis coupling of cylindrical configuration comprised of a magnetically polarized female drive member of cylinder form adpated to surround the periphery of a non-polarized male drive member of cylinder form and with radial clearance, said non-porlarized male driven member being carried by the compressor rotor, the magnetically polarized female drive member being carried by the drive shaft and having mass inertia for reaction on said threaded engagement causing protraction or retraction of the magnetically polarized female drive member over and from the non-polarized male driven member, there being snubber means for arresting and stopping the drive shaft in said protracted and retracted positions.

17. The turbocharger as set forth in claim 12, wherein the coupling means is an eddy current hysteresis coupling of cylindrical configuration comprised of a magnetically polarized female drive member of cylinder form adapted to surround the periphery of a non-polarized male driven member of cylinder form and with radial clearance, said non-polarized male member being carried by the compressor rotor, said magnetically polarized female drive member being carried by the drive shaft and having mass inertia for reaction on said threaded engagement causing protraction of the magnetically polarized female drive member over the non-polarized male driven member for activating the coupling means or retraction of the magnetically polarized female drive member from the non-polarized male drive member for deactivating the coupling means, there being snubber means for arresting and stopping the drive shaft in said protracted and retracted positions.

18. The turbocharger as set forth in claim 12, there being snubber means at opposite ends of the drive shaft for arresting and stopping the drive shaft and driven member in said protracted and retracted positions.

19. The turbocharger as set forth in claim 12, wherein said drive shaft is rotatably and slidably carried through the motor shaft on axially spaced bushings.

20. The turbocharger as set forth in claim 12, wherein the inertially responsive control means is comprised of a drive shaft free to rotate and reciprocate in a motor shaft and between protracted and retracted positions, there being a fast pitch threaded engagement between the drive shaft and the motor shaft, said drive member being carried by the drive shaft and having mass inertia for reaction on said threaded engagement causing protraction or retraction of the drive member to and from the driven member as a result of reversal of rotational velocity between the drive shaft and motor shaft, there being snubber means for arresting and stopping the drive shaft in said protracted and retracted positions.

21. The turbocharger as set forth in claim 12, wherein the inertially responsive control means is comprised of a drive shaft free to rotate and reciprocate in a motor shaft of the motor drive between protracted and retracted positions, there being a fast pitch threaded engagement between the drive shaft and the motor shaft, the drive member being carried by the drive shaft and having mass inertia for reaction on said threaded engagement shifting the drive member to said protracted position at the driven member for activating the coupling means or shifting the drive member to said retracted position and from the driven member for deactivating the coupling means as a result of reversal of rotatational velocity between the drive shaft and motor shaft, there being snubber means for arresting and stopping the drive shaft in said protracted and retracted positions.

22. The turbocharger as set forth in claim 12, wherein the coupling means is of cylindrical configuration comprised of a female drive member adapted to surround the periphery of a male driven member and with radial clearance, said male driven member being carried by the compressor rotor, said female drive member being carried by the drive shaft and having mass inertia for reaction on said threaded engagement causing protraction or retraction of the female drive member over and from the male driven member, there being snubber means for arresting and stopping the drive shaft in said protracted and retracted positions.

23. The turbocharger as set forth in claim 12, wherein the coupling means is of cylindrical configuration comprised of a female drive member adapted to surround the periphery of a male driven member and with radial clearance, said male driven member being carried by the compressor rotor, said female drive member being carried by the drive shaft and having mass inertia for reaction on said threaded engagement causing protraction of the female drive member over the male driven member for activating the coupling means or retraction of the female drive member from the male driven member for deactivating the coupling means, there being snubber means for arresting and stopping the drive shaft in said protracted and retracted positions.

24. The turbocharger as set forth in claim 12, wherein the coupling means is an eddy current hysteresis coupling of cylindrical configuration comprised of a magnetically polarized female drive member of cylinder form adapted to surround the periphery of a non-polarized male driven member of cylinder form and with radial clearance, said non-polarized male driven member being carried by the compressor rotor, the magnetically polarized female drive member being carried by the drive shaft and having mass inertia for reaction on said threaded engagement causing protraction or retraction of the magnetically polarized female drive member over and from the non-polarized male driven member, there being snubber means for arresting and stopping the drive shaft in said protracted and retracted positions.

25. The turbocharger as set forth in claim 12, wherein the coupling means is an eddy current hysteresis coupling of cylindrical configuration comprised of a magnetically polarized female drive member of cylinder form adapted to surround the periphery of a non-polarized male driven member of cylinder form and with radial clearance, said non-polarized male member being carried by the compressor rotor, said magnetically polarized female drive member being carried by the drive shaft and having mass inertia for reaction on said threaded engagement causing protraciton of the magnetically polarized female drive member over the non-polarized male driven member for activating the coupling means or retraction of the magnetically polarized female drive member from the non-polarized male driven member for de-activating the coupling means, there being snubber means for arresting and stopping the drive shaft in said protracted and retracted positions.

26. The turbocharger as set forth in claim 12, wherein the inertially responsive control means is comprised of a drive shaft free to rotate and reciprocate in a motor shaft and carrying the drive member, there being a fast pitch threaded egagement between the drive shaft and the motor shaft, a centering stem anchored to said motor shaft and projecting through said drive shaft, the drive shaft being rotatably and slidably carried to rotate and reciprocate on the centering stem, the drive shaft and drive member having mass inertia for reaction on said threaded engagement causing protraction or retraction of the drive member to and from the driven member as a result of reversal of rotational velocity between the drive shaft and the motor shaft.

27. The turbocharger as set forth in claim 12, wherein the inertially responsive control means is comprised of a drive shaft free to rotate and reciprocate in a motor shaft of the motor drive and carrying the drive member, there being a fast pitch threaded engagement between the drive shaft and the motor shaft, said drive shaft being rotatably and slidably carried through the motor shaft on axially spaced bushings and with the drive member having mass inertia for reaction on said threaded engagement causing protraction or retraction of the drive member as a result of reversal of rotational velocity between the drive shaft and motor shaft.

28. The turbocharger as set forth in claim 27, there being snubber means comprised of a stem projecting rearwardly from the drive shaft and carrying axially spaced stops alternately engageable with spaced headers fixed to the motor shaft to rotate therewith.

29. A motor assisted turbocharger for employing residual exhaust energy from and to increase air induction pressure into internal combustion engines, and including:
  a compressor rotor carried by a shaft on a first bearing means for rotation on a fixed axis, and a turbine rotor carried by said shaft for driving said compressor rotor;
  a motor drive on a second bearing means for rotation on a fixed axis separate from and aligned with said first axis;
  the compressor rotor and turbine rotor being comprised of independently rotatable masses, there being a third bearing means for rotation therebetween;
  a releasable clutch means for driving the compressor rotor free of the turbine rotor and alternately with the turbine rotor;
  slip coupling means between the motor drive and compressor rotor for transmitting torque therebetween devoid of mechanical interengagement and driving the compressor rotor free of the turbine rotor; and
  inertially responsive control means for activating and de-activating said coupling means.

30. The tubocharger as set forth in claim 29, wherein the coupling means is of cylindrical configuration comprised of a female member fixed to the motor drive and surrounding the periphery the male member with radial clearance and fixed to the compressor rotor.

31. The turbocharger as set forth in claim 29, wherein the coupling means is an eddy current hysteresis coupling of cylndrical configuration comprised of a magneticaly polarized female member of cylinder form fixed to the motor drive, and a non-polarized male member of cylinder form fixed to the compressor rotor, the female member surrounding the male member with radial clearance.

32. The turbocharger as set forth in claim 29, wherein the first bearing means has greater radial clearance than the second bearing means whereby the the combined rotor mass seeks a floating axis of rotation distinct from the axis of the second bearing means, and wherein the coupling means is an eddy current hysteresis coupling of cylindrical configuration comprised of a magnetically polarized female member of cylinder form fixed to the motor drive, and a non-polarized male member of cylinder form fixed to the compressor rotor, the female member surrounding the male member with radial clearance greater than radial displacement of said floating axis.

33. The turbocharger as set forth in claim 29, wherein the releasable clutch means is an overrunning clutch means for driving the compressor rotor with the turbine rotor and for release of the compressor rotor from the turbine rotor when driven at a velocity exceeding that of the turbine rotor, whereby the compressor and turbine rotor masses can be independently accelerated.

34. The turbocharger as set forth in claim 29, wherein the turbine rotor is carried on a quill extending through the compressor shaft on said first bearing means, there being bearings at opposite ends of the compressor shaft rotatably supporting said quill, and wherein the releasable clutch means is an overrunning clutch means for response to the relative direction of rotative force between the compressor rotor and turbine rotor and comprised of drive members free to disengagably articulate in an annulus between a drive race on said quill and a driven race of said compressor shaft driving the compressor rotor, whereby the compressor and turbine rotor masses can be independently accelerated.

35. The turbocharger as set forth in claim 29, wherein the turbine rotor and compressor rotor are carried on the first mentioned shaft on said first bearing means, the turbine rotor being fixed to said first mentioned shaft, there being a radial bearing at the distal compressor end of said shaft and a radial-axial thrust bearing adjacent thereto and rotatably supporting and axially positioning the compressor rotor on said first mentioned shaft, and wherein the releasable clutch means is an overrunning clutch means positioned at the compressor end of said shaft for response to the relative direction of rotative force between the compressor rotor and turbine rotor and comprised of drive members free to disengagably articulate in an annulus between a drive race on said first mentioned shaft and a driven race on and driving the compressor rotor, whereby the compressor and turbine rotor masses can be independently accelerated.

36. The turbocharger as set forth in claim 29, wherein the coupling means is comprised of a drive member and a driven member carried by the compressor rotor, and wherein the inertially responsive control means is comprised of a drive shaft free to rotate and reciprocate in a motor shaft of the motor drive, there being a fast pitch threaded engagement between the drive shaft and the motor shaft, said drive member being carried by the drive shaft and having mass inertia for reaction on said threaded engagement causing protraction of the drive member to the driven member for activating the coupling means or retraction of the drive member from the driven member for de-activating the coupling means as a result of reversal of rotational velocity between the drive shaft and motor shaft.

37. The turbocharger as set forth in claim 29, wherein the coupling means is comprised of a drive member and a driven member carried by the compressor rotor, and wherein the inertially responsive control means is comprised of a drive shaft free to rotate and reciprocate in a motor shaft of the motor drive, there being a fast pitch threaded engagement between the drive shaft and the motor shaft, said drive member being carried by the drive shaft and having mass inertia for reaction on said threaded engagement causing protraction of the drive member to the driven member for activating the coupling means or retraction of the drive member from the driven member for de-activating the coupling means as a result of reversal of rotational velocity between the drive shaft and the motor shaft.

38. The turbocharger as set forth in claim 29, wherein the coupling means is comprised of a drive member and a driven member carried by the compressor rotor, and wherein the inertially responsive control means is comprised of a drive shaft free to rotate and reciprocate in a motor shaft of the motor drive between protracted and retracted positions, there being a fast pitch threaded engagement between the drive shaft and the motor shaft, said drive member being carried by the drive shaft and having mass inertia for reaction on said threaded engagement shifting the drive member to said protracted position at the driven member for activating the coupling means or shifting the drive member to said retracted position and from the driven member for deactivating the coupling means as a result of reversal of rotational velocity between the drive shaft and motor shaft, there being snubber means for arresting and stopping the drive shaft in said protracted and retracted positions.

39. The turbocharger as set forth in claim 29, wherein the coupling means is an eddy current hysteresis coupling of cylindrical configuration comprised of a magnetically polarized female drive member of cylinder form adapted to surround the periphery of a non-polarized male driven member of cylinder form and with radial clearance, said non-polarized male driven member being carried by the compressor rotor, and wherein the inertially responsive control means is comprised of a drive shaft free to rotate and reciprocate in a motor shaft of the motor drive between protracted and retracted positions, there being a fast pitch threaded engagement between the drive shaft and the motor shaft, the magnetically polarized female drive member being carried by the drive shaft and having mass inertia for reaction on said threaded engagement causing protraction or retraction of the magnetically polarized female drive member over and from the non-polarized male driven member as a result of reversal of rotational velocity between the drive shaft and motor shaft, there being snubber means for arresting and stopping the drive shaft in said protracted and retracted positions.

40. The turbocharger as set forth in claim 29, wherein the coupling means is comprised of a drive member and a driven member carried by the compressor rotor, and wherein the inertially responsive control means is comprised of a drive shaft free to rotate and reciprocate in a motors haft of the motor drive and carrying the drive member, there being a fast pitch threaded engagement between the drive shaft and the motor shaft, a centering stem anchored to said motor shaft and projecting through said drive shaft, the drive shaft being rotatably and slidably carried to rotate and reciprocate on the centering stem, the drive shaft and drive member having mass inertia for reaction on said theaded engagement causing protraction or retraction of the drive member to and from the driven member as a result of reversal of rotational velocity between the drive shaft and motor shaft.

41. The turbocharger as set forth in claim 40, there being snubber means at opposite ends of the drive shaft for arresting and stopping the drive shaft and driver in said protracted and retracted positions.

42. The turbocharager as set forth in claim 29, wherein the coupling means is comprised of a drive member and a driven member carried by the compressor rotor, and wherein the inertially responsive control means is comprised of a drive shaft free to rotate and reciprocate in a motor shaft of the motor drive and carrying the drive member, there being a fast pitch threaded engagement between the drive shaft and the motor shaft, said drive shaft being rotatably and slidably caried through the motor shaft on axially spaced bushings and with the drive member having mass inertia for reaction on said threaded engagement causing protraction or retraction of the drive member to and from the driven member as a result of reversal of rotational velocity between the drive shaft and motor shaft.

43. The turbocharger as set forth in claim 42, there being snubber means comprised of a stem projecting rearwardly from the drive shaft and carrying axially space stops alternately engageable with spaced headers fixed to the motor shaft to rotate therewith.

\* \* \* \* \*

UNITED STATES PATENT AND TRADEMARK OFFICE
CERTIFICATE OF CORRECTION

PATENT NO.     : 6,305,169 B1
DATED          : October 23, 2001
INVENTOR(S)    : Ralph P. Maloof It is certified that error appears in the above-identified patent and that said Letters Patent is hereby corrected as shown below:

<u>Title page,</u>
Item [76] and all other occurrences of the inventor's name, the surname "Mallof" should be corrected to read -- Maloof --.

Signed and Sealed this

Twenty-eighth Day of May, 2002

*Attest:*

*Attesting Officer*

JAMES E. ROGAN
*Director of the United States Patent and Trademark Office*